United States Patent [19]
Kai et al.

[11] Patent Number: 5,502,575
[45] Date of Patent: Mar. 26, 1996

[54] IMAGING APPARATUS HAVING A COUNTERFEITING PREVENTION FUNCTION

[75] Inventors: Tsutomu Kai, Hirakata; Kazuyuki Murata, Tsuzuki; Yasuhiro Kuwahara, Osaka; Hitoshi Ono, Hirakata; Tsutomu Mikami, Hirakata; Tomoko Suetake, Hirakata; Akio Kojima, Neyagawa, all of Japan

[73] Assignee: Matsushita Electric Industrial Co., Ltd., Osaka, Japan

[21] Appl. No.: 99,717

[22] Filed: Jul. 29, 1993

[30] Foreign Application Priority Data

Aug. 6, 1992 [JP] Japan ................................. 4-209360

[51] Int. Cl.⁶ .......................... H04N 1/00; G06K 9/00; H04L 9/00
[52] U.S. Cl. ........................ 358/405; 382/135; 380/43; 380/54; 355/201; 283/902
[58] Field of Search .................. 382/7, 17, 135; 358/441, 405, 440; 380/3, 5, 18, 20, 54, 43; 355/201; 283/902, 74; H04N 1/46, 1/00

[56] References Cited

U.S. PATENT DOCUMENTS

| | | | |
|---|---|---|---|
| 4,823,388 | 4/1989 | Mizutani et al. | 380/23 |
| 5,189,700 | 2/1993 | Blandford | 380/23 |
| 5,216,724 | 6/1993 | Suzuki et al. | |
| 5,239,584 | 8/1993 | Hershey et al. | 380/28 |
| 5,257,119 | 10/1993 | Funada et al. | 358/440 |
| 5,313,521 | 5/1994 | Torii et al. | 380/21 |

FOREIGN PATENT DOCUMENTS

| | | |
|---|---|---|
| 0342060 | 11/1989 | European Pat. Off. . |
| 0506332 | 9/1992 | European Pat. Off. . |
| 0529745 | 3/1993 | European Pat. Off. . |
| 0529744 | 3/1993 | European Pat. Off. . |
| 0529746 | 3/1993 | European Pat. Off. . |
| 1-316783 | 12/1989 | Japan .............. H04N 1/40 |
| 2-284189 | 11/1990 | Japan .............. G03G 21/00 |
| 4-332260 | 11/1992 | Japan .............. H04N 1/387 |

*Primary Examiner*—James J. Groody
*Assistant Examiner*—Cheryl Cohen
*Attorney, Agent, or Firm*—Ratner & Prestia

[57] ABSTRACT

An imaging apparatus comprising a counterfeiting prevention arrangement and reliably preventing counterfeit reproduction of currency, negotiable certificates, and other registered documents is provided by preventing modification or removal of the counterfeiting prevention arrangement. Modification or removal of the counterfeiting prevention arrangement is prevented in this imaging apparatus by integrating circuit elements or components of the counterfeiting prevention arrangement with circuit elements or components of the image processors of the imaging system in a single chip, or sealing these components in a single mold, effectively preventing modification or removal of the counterfeiting prevention arrangement without disabling the imaging system.

14 Claims, 10 Drawing Sheets

| CHARAC-TERS | TRACKING NUMBER |   |   |   |   |
|---|---|---|---|---|---|
|  | X | Y | 1 | 2 | 3 |
| CODE (HEX) | 58 | 59 | 31 | 32 | 33 |

| CHARAC-TERS | ID CODE |   |   |   |   |   |   |   |
|---|---|---|---|---|---|---|---|---|
|  | J | A | P | A | N | 1 | 2 | 3 |
| CODE (HEX) | 4A | 41 | 50 | 41 | 4E | 31 | 32 | 33 |

5,502,575

IMAGING APPARATUS HAVING A COUNTERFEITING PREVENTION FUNCTION

BACKGROUND OF THE INVENTION

1. Field of the Invention

The present invention relates to an imaging apparatus for reading, processing and copying an image from an original, and relates particularly to an imaging apparatus comprising a counterfeiting prevention means.

2. Description of the Prior Art

Imaging apparatuses in general read an image from an original placed on a copy table or platen, and produce a faithful reproduction of the scanned image. These copier technologies, particularly color copying technologies, have advanced so significantly in recent years that copies nearly indistinguishable from the original can now be made. The fidelity of these copies can, of course, also be put to illegal use, including the counterfeit reproduction of paper currency, stock and other negotiable certificates, and other valuable items that cannot be legally copied.

Recent imaging apparatuses have thus been equipped with a means for preventing counterfeiting. The counterfeiting prevention arrangement proposed in Japanese Patent Laid-open Publication Number H1-3167813 comprises a means for determining whether duplication of the original is prohibited, and a means for converting the image data based on the result of this determination. Imaging apparatuses comprising the counterfeiting prevention arrangement is shown in FIG. 13.

As shown in FIG. 13, this imaging apparatus scans the original 7 with the input device 40, processes the image using both image processors 5A, 5B, and outputs the image through the output device 6 to obtain the hard-copy output 8. To prevent counterfeiting, a counterfeiting prevention arrangement 1 comprising a detector 1A and a prevention device 1B is added to the imaging system doing the copying. Note that this imaging apparatus also comprises a control 2 and editing device 3 connected to the control bus. Using a feature signal of protected currency or certificates, etc., the detector 1A in this apparatus detects when currency or certificates that cannot be copied are placed on the original table and activates the prevention device 1B accordingly. The prevention device 1B thus either stops operation of the image processors 5A, 5B, or modifies the processed image so that a normal copy of the protected currency, negotiable certificates, and other registered documents cannot be made.

An imaging apparatus with this counterfeiting prevention arrangement 1 can prevent simple attempts to counterfeit currency, negotiable certificates, and other valuable documents. This counterfeiting prevention arrangement 1 is not tamperproof, however, and when modified cannot prevent counterfeiting. Such modifications include simple removal of the counterfeiting prevention arrangement 1 shown in FIG. 13 by the user; when the counterfeiting prevention arrangement 1 is removed, the copier functions normally and counterfeiting cannot be prevented. The same is true when the circuit containing the detector 1A and prevention device 1B is cut. Such modifications can be simply performed by anyone with a basic level of knowledge and skill, and it is therefore not possible to provide an imaging apparatus with a tamperproof counterfeiting prevention arrangement.

SUMMARY OF THE INVENTION

Therefore, an object of the present invention is to provide an imaging apparatus that can dependably prevent counterfeiting.

To achieve this object an imaging apparatus according to the present invention integrates a counterfeiting prevention means for currency or negotiable certificates, and provides a protection means for preventing modifications to the integrated counterfeiting prevention means.

In this imaging apparatus, modifications to the counterfeiting prevention means are prevented by the protection means, and counterfeiting of currency, negotiable certificates, and other registered documents can be prevented because the counterfeiting prevention means always functions normally.

By thus providing a protection means for the counterfeiting prevention means, an imaging apparatus according to the present invention can safely and securely prevent copying and counterfeiting of currency, negotiable certificates, and other registered documents because any attempt to modify the counterfeiting prevention means with the purpose of counterfeiting will result in non-operation or abnormal operation of the imaging system because the counterfeiting prevention means cannot be modified.

BRIEF DESCRIPTION OF THE DRAWINGS

The present invention will become more fully understood from the detailed description given below and the accompanying diagrams wherein.

DESCRIPTION OF PREFERRED EMBODIMENT

Figure 1:
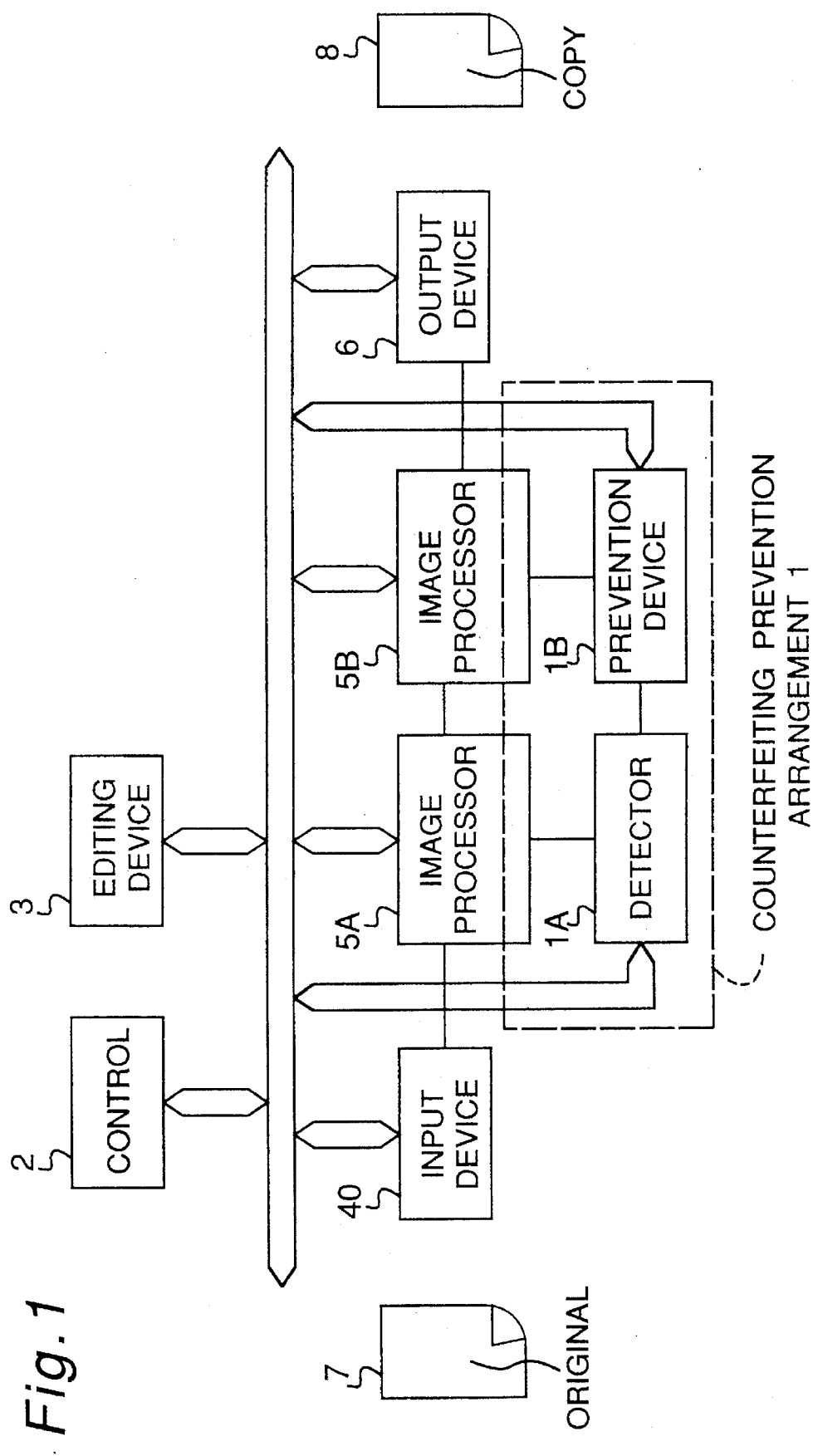
FIG. 1 is a block diagram of an imaging apparatus according to the present invention.
Figure 13:
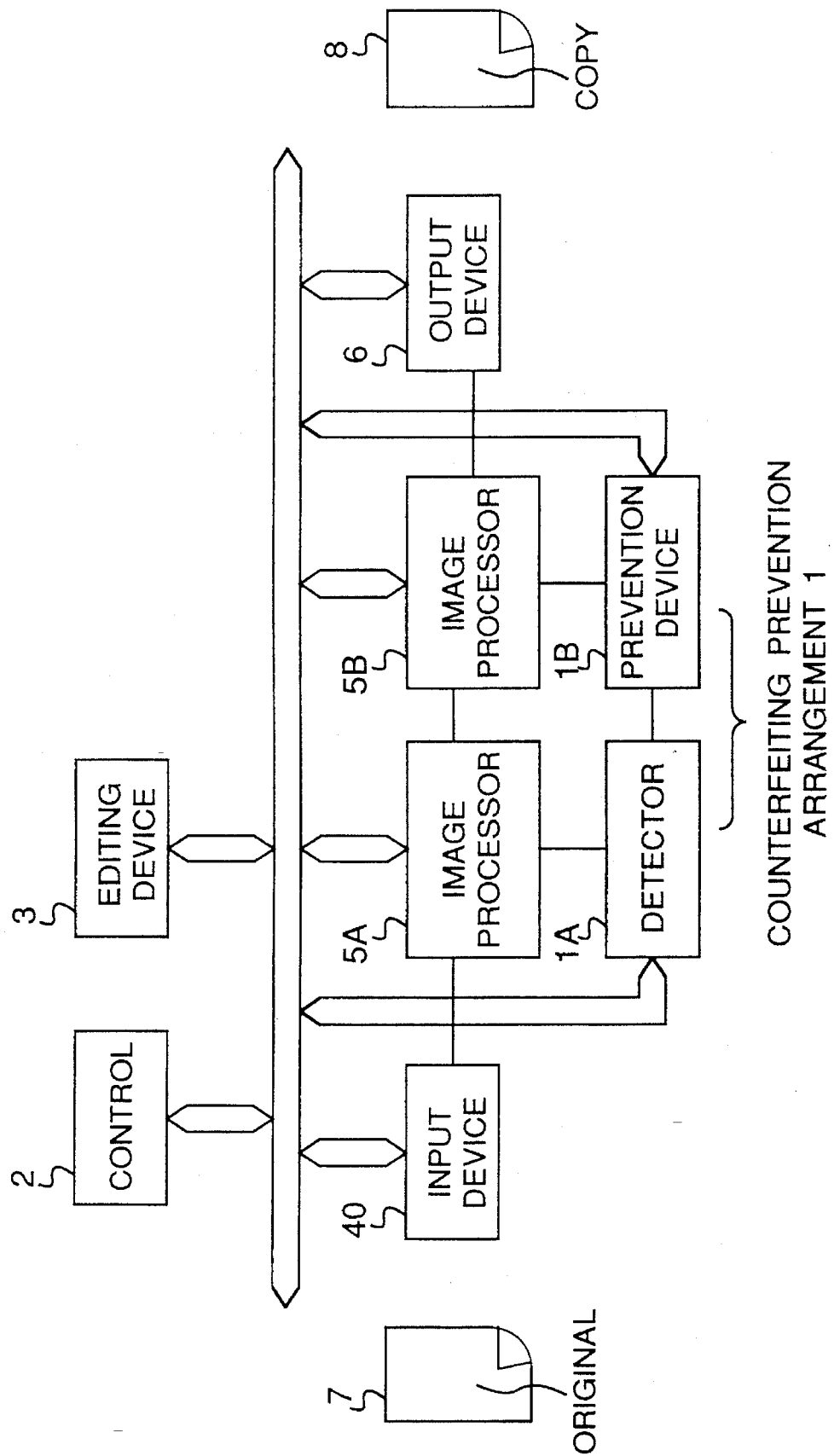
FIG. 13 is a block diagram of a conventional imaging apparatus comprising a counterfeiting prevention means.

The preferred embodiment of an imaging apparatus according to the invention is described below with reference to the accompanying figures, of which FIG. 1 is a block diagram of an imaging apparatus according to the present invention. The basic configuration and operation of this apparatus are the same as the conventional imaging apparatus described above with reference to FIG. 13, and further description is omitted below.

The distinguishing characteristic of an imaging apparatus according to the present invention is that the counterfeiting prevention arrangement 1 cannot be tampered with without disabling the normal imaging operation. In other words, a protection means is formed by integrating the counterfeiting prevention arrangement 1 with part of the image processors 5A, 5B, i.e., with part of the imaging system. One means of achieving this integration is to form the circuit components required for counterfeiting prevention and at least part of the imaging system circuitry on the same chip. Another integration means is to seal the circuit components required for counterfeiting prevention and at least part of the imaging system circuitry in the same mold.

By thus integrating the counterfeiting prevention arrangement 1 with the imaging system, the user cannot remove the counterfeiting prevention arrangement 1 from the imaging system for the purpose of counterfeiting currency, negotiable certificates, and other registered documents because the counterfeiting prevention arrangement 1 is integral to the imaging system. The imaging system is thus rendered nonoperational when the counterfeiting prevention arrangement 1 is removed or the signal buses to the chip or mold integrating the counterfeiting prevention arrangement 1 with the imaging system are cut. Counterfeit reproduction of currency, negotiable certificates, and other registered documents can thus be reliably prevented because such tampering effectively disables the imaging system.

While the protection means of the previous embodiment is achieved by integrating the counterfeiting prevention arrangement and imaging system to a single chip or a single sealed molding, an alternative embodiment comprising a protection means for preventing modification of a discrete counterfeiting prevention arrangement is described below.

Figure 2:
FIG. 2 is a diagram of the data content of the image signal used in the imaging apparatus of the present invention.

The protection means of this embodiment comprises a connection detection means for monitoring the connection of the signal bus to the counterfeiting prevention arrangement, and a means for stopping or disrupting normal imaging system operation when an abnormal connection is detected. Specifically, identification data is added to the image data as shown in FIG. 2, and this identification data is output to the image bus or image signal bus. Connection between the counterfeiting prevention arrangement, i.e., the LSI devices and other circuit components thereof, to the image bus or image signal bus is confirmed by handshakes. The image data is also encrypted with the decryption key obtained from a peripheral LSI device. Thus, when the user, for example, cuts the signal bus to the counterfeiting prevention arrangement 1 for the purpose of counterfeiting currency, negotiable certificates, and other registered documents, the connection detection means detects an abnormal bus connection when fetching the decryption key, and either stops or disrupts the imaging operation. It is therefore not possible to produce counterfeit copies of currency, negotiable certificates, and other registered documents by modifying the counterfeiting prevention arrangement.

The control bus or control signal bus can also be protected by adding control data to the data output to the control bus or control signal bus. While protecting the data bus is not directly related to the counterfeiting prevention arrangement, the data bus can be protected by also outputting the signals required by the counterfeiting prevention arrangement over the transfer bus carrying the signals required for normal imaging.

Figure 3:
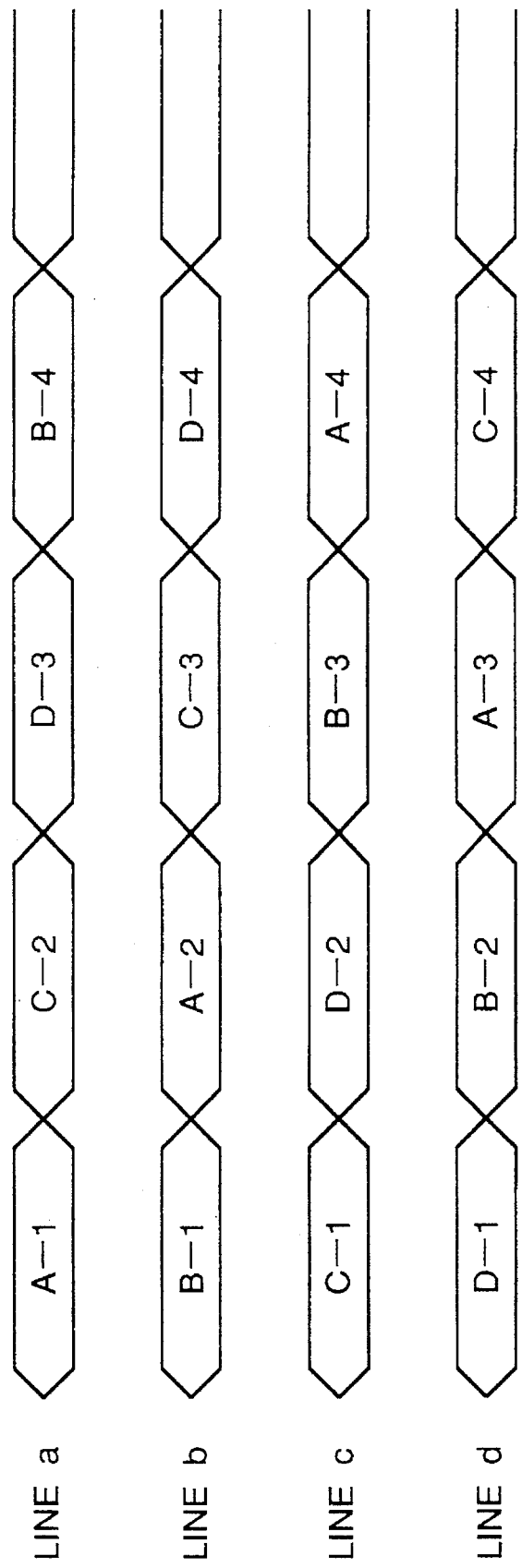
FIG. 3 is a diagram of the data content of the scrambled signal used in the imaging apparatus of the invention.

For example, as shown in FIG. 3, the signals C, D required for the normal imaging operation can be mixed or scrambled with the signals A, B required by the counterfeiting prevention arrangement, and output over the same bus. Modifying the imaging apparatus by cutting this signal bus also becomes impossible. This is because modifying these buses is the same as modifying the basic imaging operation, and the normal imaging operation cannot be obtained. It is to be noted that the signal mixing operation can be applied to all required signals or to only part, and tampering can be prevented without using a connection detection means by thus manipulating the signal buses. To disrupt the image signal as described above, it is possible to simply introduce noise to the signal or to add another image signal to the counterfeit signal so that a normal image output cannot be obtained.

The means summarized above for protecting the counterfeiting prevention arrangement against tampering is described in detail below.

Figure 4:
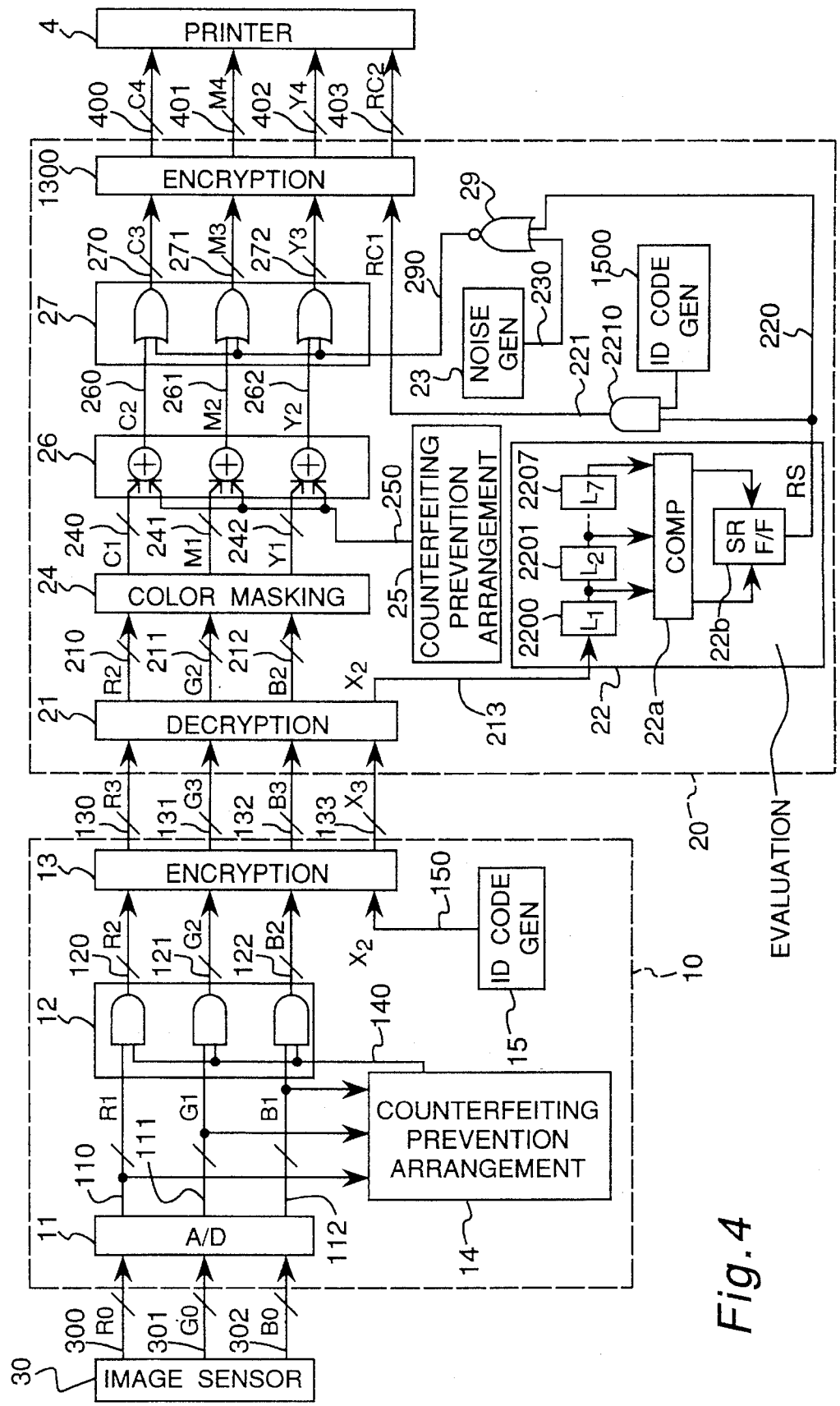
FIG. 4 is a circuit diagram of the imaging apparatus according to a preferred embodiment of the present invention.
Figure 5:
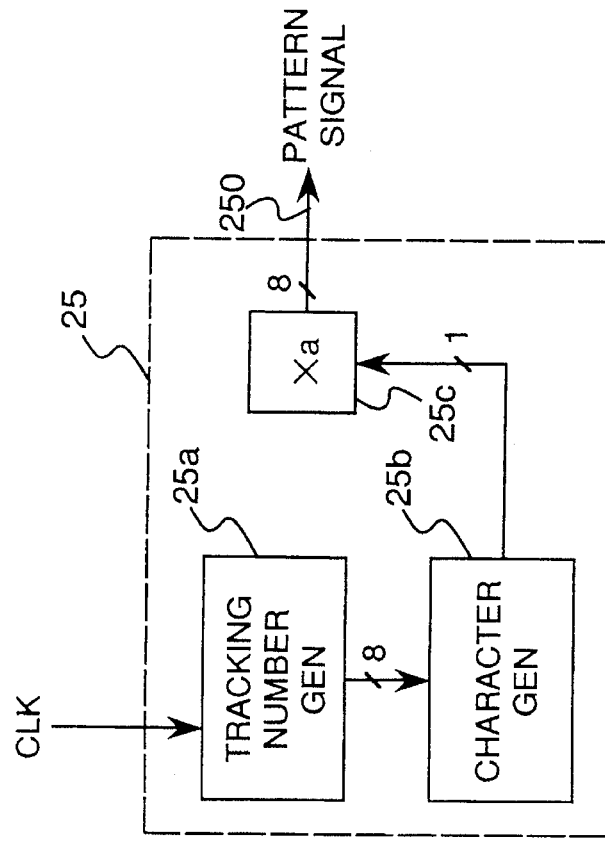
FIGS. 5 and 6 are a block diagram of a counterfeiting prevention arrangements 14 and 25 shown in FIG. 4.
Figure 6:
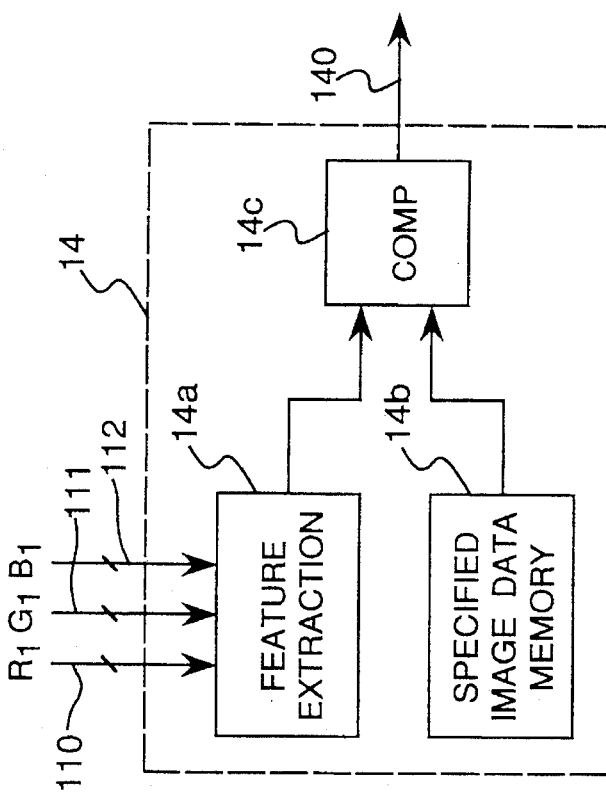

Referring to FIG. 4 a block diagram of an imaging apparatus according to a first embodiment of the invention is shown. The imaging apparatus includes an image sensor 30, an A/D converter 11, a counterfeiting preventing arrangement 14, a detail of which is shown in FIG. 5, AND circuits 12, an encryption circuit 13, and an identification (ID) code generator 15. The circuit enclosed by a dotted line 10 is a first processing unit. The imaging apparatus further includes a decryption circuit 21, evaluation circuit 22, a noise generator 23, a color masking circuit 24, a counterfeiting prevention arrangement 25, a detail of which is shown in FIG. 6, a synthesizing circuit 26, a mixer 27 formed by OR gates, an encryption circuit 1300 identical to the encryption circuit 13, an ID code generator 1500 identical to the ID code generator 15 and a printer 4. The circuit enclosed by a dotted line 20 is a second processing unit.

The image sensor 30 produces R0 signal 300, G0 signal 301, and B0 signal 302 which are converted to digital signals R1, G1, and B1 (110, 111, and 112, respectively) by the analog/digital (A/D) converter 11. These digital signals R1 110, G1 111, and B1 112 are input to the counterfeiting prevention arrangement 14, which is described in detail below.

As shown in FIG. 5, the counterfeiting prevention arrangement 14 has a feature extraction circuit 14a for extracting the features of the image obtained from the image sensor 30, and outputs the feature signal to the comparator 14c. The comparator 14c then compares the input feature signal of the image to be copied with the shape, color, pattern, and other correlation data obtained from the specified image data memory 14b to determine the degree of similarity between the copy original and the currency, negotiable certificates, and other documents registered as illegal to copy.

If the comparator 14c determines that the correlation (similarity) between the copy original and any of the documents registered in the specified image data memory 14b is strong, i.e., determines that the original to be copied is currency, a negotiable certificate, or other registered document, the comparator 14c sets the control signal 140 level LOW, thus causing each of the AND circuits 12 to output 0.

The signals from the image sensor 30 are thus not passed through the AND circuits 12 as output signals R2 120, G2 121, and B2 122, and the original cannot be imaged. However, if the correlation (similarity) is weak, i.e., the comparator 14c determines that the original is not currency, a negotiable certificate, or other registered document, the control signal 140 is HIGH, causing the AND circuits 12 to throughput the input signals R1 110, G1 111, and B1 112 as the corresponding output signals R2 120, G2 121, and B2 122 to enable imaging of the original.

As shown in FIG. 4, the output signals R2 120, G2 121, and B2 122 are encrypted by the encryption circuit 13 together with an identification code $X_2$ (signal 150) output from the identification (ID) code generator 15. The method of generating this encryption data is described in detail below.

The A/D converter 11 required for copy image generation, the counterfeiting prevention arrangement 14, and the AND circuits 12 are integrated into a single component shown by the dotted line 10 in FIG. 4 as a first processing unit. The contents of this dotted line 10 are integrated into a single LSI device or molded unit, making it impossible to disconnect the counterfeiting prevention arrangement 14 or the AND circuits 12 without disabling the entire imaging operation and thus protecting the counterfeiting prevention arrangement 14.

By further integrating the encryption circuit 13 shown within the dotted line 10 in FIG. 4 into this same LSI device or molded unit, it becomes impossible to interrupt the output of the LSI device or molded unit (dotted line 10), i.e., signals R3 130, G3 131, B3 132, and the encryption signal 133 ($X_3$), without disabling the imaging operation. This further protects the counterfeiting prevention arrangement 14 against tampering, removal, or replacement.

Why it is possible to prevent modification or replacement of the LSI device or molded unit (dotted line 10) is described next.

The image signals R3 130, G3 131, B3 132 and encryption signal 133 ($X_3$) converted to encrypted data by the LSI device or molded unit (the "processing unit" below) are separated and decrypted to signals R2 220, G2 221, B2 222, $X_2$ 150 identical to the pre-encryption signals by the decryption circuit 21. The identification code $X_2$ signal 213 is evaluated by the evaluation circuit 22 to determine whether the first processing unit 10 is a normal (authorized) unit or a modified (unauthorized) unit, thus preventing modification or replacement of the first processing unit 10.

The color masking circuit 24 of the second processing unit 20, indicated by the other dotted line in FIG. 4, compensates for the spectral characteristics of the image sensor 30, the muddiness of the ink during image formation by the printer 4, and conversion from a reflective color expression to a density expression to generate the actual CMY printer signals (C1 240, M1 241, and Y1 242) from image signals R2 210, G2 211, B2 212 (which are identical to the image signals before encryption). The synthesizing circuit 26 mixes the CMY color data with the signal 250 from a second counterfeiting prevention arrangement 25 which is explained in detail below.

Figures 7, 8, 9:
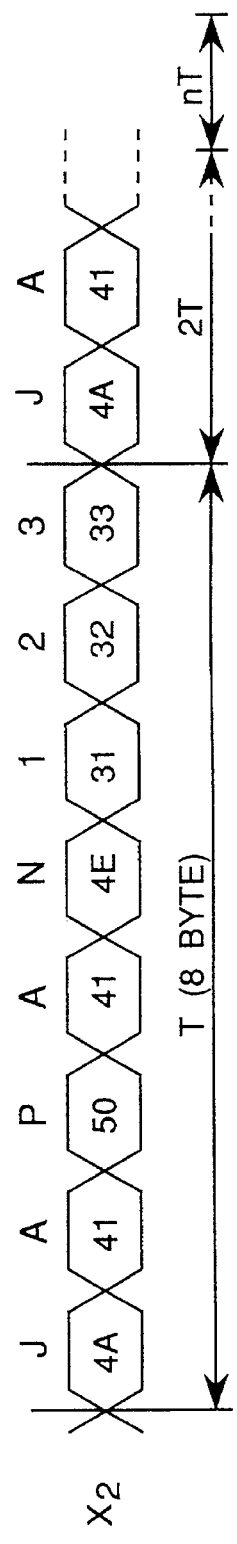
FIG. 7 is a diagram showing tracking data.
FIGS. 8 and 9 are diagrams showing identification code.

Referring to FIG. 6, a detail of the counterfeiting prevention arrangement 25 in shown, which includes a character generator 25b for converting the character code output from tracking number generator 25a to one bit bit-map data, which is converted to unobtrusive density data of a specified low density level by the multiplier 25c. This density data is output as pattern signal 250. If the character code of the tracking number is "XY123" as shown in FIG. 7, the tracking number is output as the hexadecimal ("h" below) string 58h 59h 31h 32h 33h of one byte characters, which are converted to bit-mapped image data by the character generator 25b. When the printer 4 prints the print data synthesized from three color signals (C2 260, M2 261, and Y2 262) by the synthesizing circuit 26, a reserved number specific to the imaging apparatus is added to copies of currency, negotiable certificates, and other registered documents. This number makes it possible to trace the machine on which the copies were made when such documents are counterfeited.

This color printer 4 uses cyan (C), magenta (M), and yellow (Y) ink to produce color images.

The color masking circuit 24 required for copy image generation, the counterfeiting prevention arrangement 25, and the synthesizing circuit 26 are integrated into a single component shown by the dotted line 20 in FIG. 4. The contents of this dotted line 20 are integrated into a single LSI device or molded unit, making it impossible to disconnect the counterfeiting prevention arrangement 25 or the synthesizing circuit 26 without disabling the entire imaging operation and thus protecting the counterfeiting prevention arrangement 25. The same objective can, of course, also be obtained by substituting the counterfeiting prevention arrangement 25 for the counterfeiting prevention arrangement 14, and the synthesizing circuit 26 for the AND circuits 12.

Operation of the evaluation circuit 22 is described below with reference to FIGS. 4, 8, and 9. FIG. 8 is used to describe the identification code, and FIG. 9 to describe the operation of the ID code generator 15.

The ID code generator 15 repeatedly generates the character string of the ID code, examples of which are shown in FIG. 8. The character string, "JAPAN123" in FIG. 8, of the ID code is expressed as an eight byte hexadecimal string of one byte hexadecimal characters ("4A 41 50 41 4E 31 32 33" in FIG. 8). As shown in FIG. 9, this hexadecimal code is repeated at a regular 8-byte cycle only during the copy operation. The code is generated only during the copy operation to prevent analysis of the ID code by any third party attempting to tamper with the system. Using video data of a repeated character string for the ID code instead of simply a HIGH or LOW signal state also complicates analysis of the ID code and provides further protection against analysis and tampering.

The ID code $X_2$ (signal 213) isolated by the decryption circuit 21 is converted from serial data to parallel data by the eight latch circuits 2200–2207, and the comparator 22a extracts the ID code "JAPAN123", i.e., the hexadecimal ID code "4A 41 50 41 4E 31 32 33" repeated at a regular 8-byte cycle, by an 8-byte matching comparison. It is to be noted that while eight bytes are used in this embodiment, an n-byte matching comparison is used for ID codes of n characters.

When the processing unit 10 is determined to be a modified unit by extracting the ID code, the flip-flop 22b is reset and the control signal 220 (RS) is set LOW. When the control signal 220 is LOW, the noise generator 23 signal 230 is output 290 by the NOR circuit 29. This causes noise to be mixed with the normal C2 260, M2 261, and Y2 262 color signals by mixer 27, thus resulting in abnormal image data signals C3 270, M3 271, and Y3 272. These abnormal image signals thus prevent imaging of currency, negotiable certificates, and other registered documents when the processing unit 10 is tampered with. When the control signal 220 is LOW, the ID code generator 1500 output is masked by AND circuits 2210 so that the ID signal 221 is not output to the printer 4. The printer 4 stops when the ID code is not recognized, and printing is not possible. It is to be noted that either outputting abnormal image signals or stopping printer 4 operation alone is sufficient to prevent counterfeiting.

When the processing unit 10 is determined by ID code extraction to be a valid processing unit 10, the flip-flop 22b is set, and control signal 220 (RS) is set to HIGH. When the control signal 220 is HIGH, the noise generator 23 output signal 230 is not output 290 by the NOR circuit 29, and the output signal 290 remains LOW. Because the output signal 290 is LOW, the mixer 27 outputs the normal C2 260, M2 261, and Y2 262 color signals as normal image data signals C3 270, M3 271, and Y3 272, thus enabling normal printing of documents other than currency, negotiable certificates, and other registered documents by the printer 4. The ID code generator 1500 output is also output as ID signal 221 to the printer 4, which recognizes the ID code and thus operates normally.

By the evaluation circuit 22 thus evaluating the ID code signal 213, it is possible to determine whether the processing unit 10 is normal or has been tampered with, and to disrupt the print image or disable printer 4 operation as required. Unauthorized modification of the processing unit 10 can thus be prevented, and the counterfeiting prevention arrangement can be protected.

It is also possible to encrypt the print image data signals C3 270, M3 271, and Y3 272, and the ID code data 221 using the encryption circuit 1300 identical to the encryption circuit 13 of the first processing unit 10, and to output the encrypted image signals C4 400, M4 401, and Y4 402, and the ID code data (RC2) 403 to the printer 4. A decryption circuit similar to the decryption circuit 21 of the second processing unit 20 is then used in the printer to separate and decrypt the print image data and ID code, thus preventing modification or replacement of the processing unit 20.

By further integrating the decryption circuit 21 required for decryption into the processing unit 20 as shown in FIG. 4 in a one-chip LSI device or molded unit, it becomes impossible to interrupt the input signals, i.e., signals R3 130, G3 131, B3 132, and the encryption signal 133 ($X_3$). This provides further protection against tampering, removal, or replacement of either the first 10 or second integrated processing unit 20.

Figure 10:
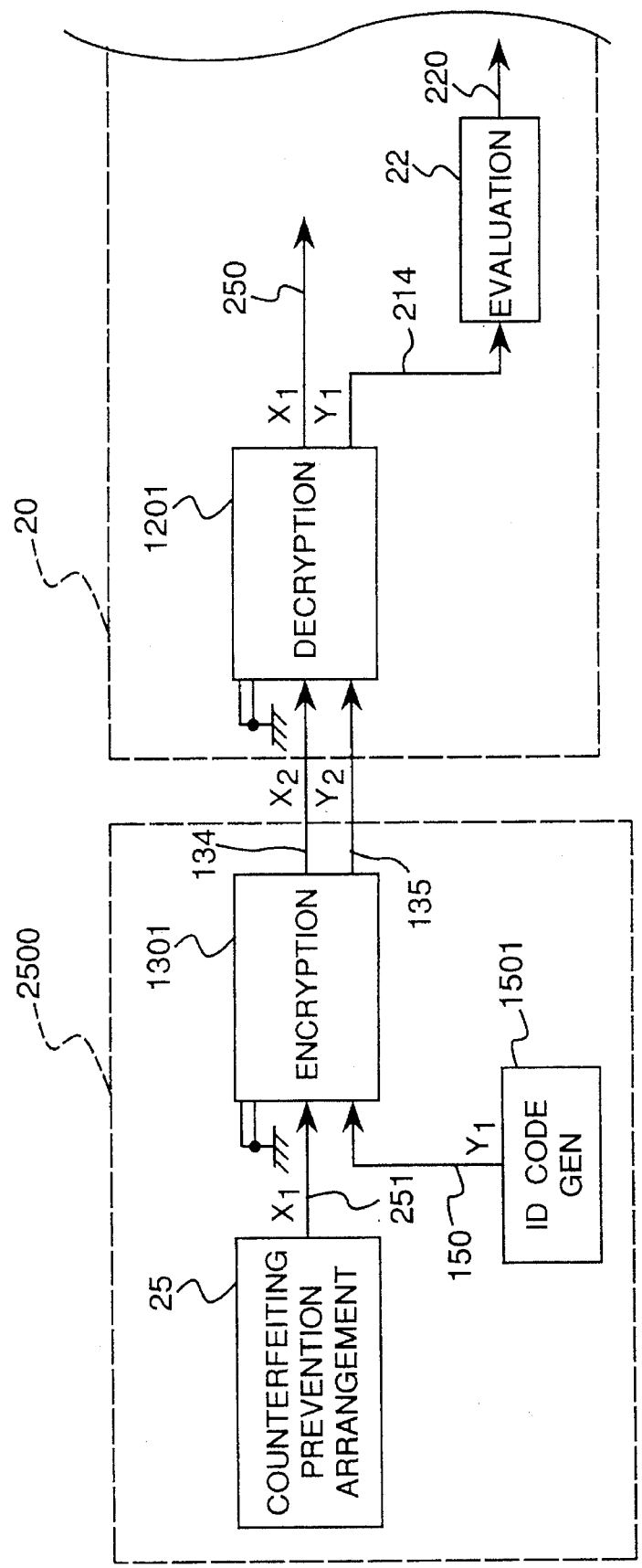
FIG. 10 is a block diagram showing a modification of encryption circuit and decryption circuit shown in FIG. 4.

If as shown in FIG. 10 the counterfeiting prevention arrangement 25 is separated from the processing unit 20 and provided as a discrete unit, it is necessary to protect the counterfeiting prevention control signal 251. This is accomplished using an encryption circuit 1301, decryption circuit 2101, and ID code generator 1501 identical to the encryption circuit 13, decryption circuit 21, and ID code generator 15 shown in FIG. 4.

The counterfeiting prevention control signal 251 ($X_1$) is thus mixed and encrypted with ID code 150 ($Y_1$) by the encryption circuit 1301, resulting in signals 134 ($X_2$) and 135 ($Y_2$). The decryption circuit 2101 in the processing unit 20 separates and decrypts signals $X_I$ 250 and $Y_1$ 214. The separated ID signal 214 is evaluated by the evaluation circuit 22 to determine whether the processing unit 2500 is normal or has been tampered with. Because signals 251 and 150 are mixed and then encrypted, both signals are required for decryption. Signals 134 and 135 therefore cannot be cut, and control signal 251 is reliably output to the synthesizing circuit 26 as control signal 250 shown in FIG. 4. It is therefore not possible to remove or modify the processing unit 2500, and the counterfeiting prevention arrangement 25 is protected.

By thus encrypting the data sent between the processing units when plural processing units are provided, unauthorized modifications of the processing units can be prevented, and the normal counterfeiting prevention function can be protected.

It is to be noted that because the ID code is only generated during the imaging operation, it is impossible to analyze the ID code and the protection function is thus enhanced.

Figure 11:
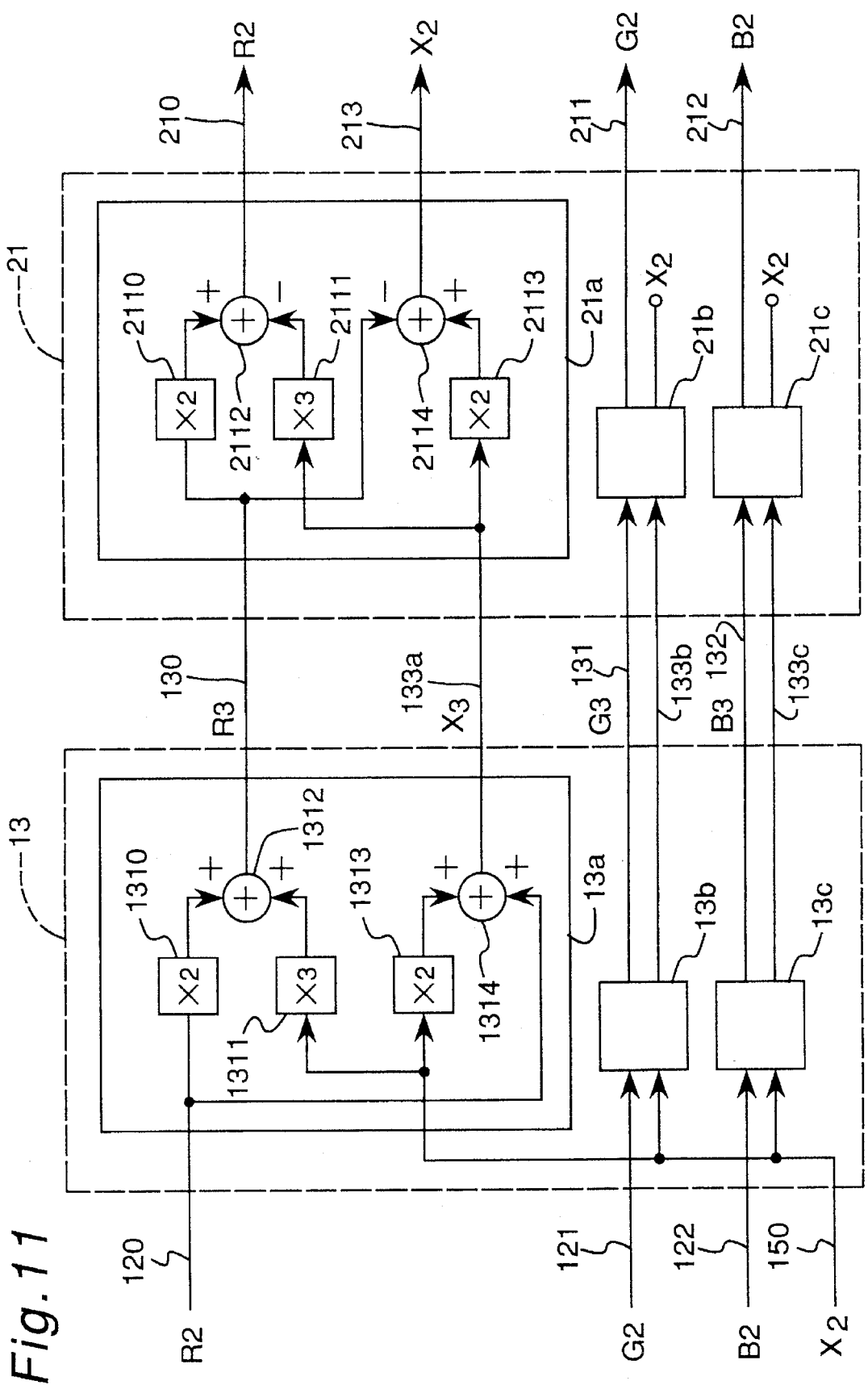
FIG. 11 is circuit diagram showing a detail of the encryption circuit and the decryption circuit.

Referring to FIG. 11, a detail of the encryption circuit 13 and the decryption circuit 21 are described.

It is assumed below that the encryption process mixes n input signals X to generate n encrypted signals Y, and a matrix operation is used for the mixing operation. If the matrix is M, then Y=MX. If matrix M is a regular matrix, there is only one inverse matrix $M^{-1}$, and $MM^{-1}=M^{-1}M=I$ where I is a unit matrix. The decryption process can therefore obtain the source input signal X by solving for $X=M^{-1}Y$ where $M^{-1}Y=M^{-1}MX=IX=X$. For example, if it is assumed that n= 2, encrypted data R3, X3 can be obtained from equation [1].

$$\begin{vmatrix} R & 3 \\ X & 3 \end{vmatrix} = \begin{vmatrix} 2 & 3 \\ 1 & 2 \end{vmatrix} \begin{vmatrix} R & 2 \\ X & 2 \end{vmatrix}. \tag{1}$$

Because the matrix M is given by the following equation, $$M = \begin{vmatrix} 2 & 3 \\ 1 & 2 \end{vmatrix}$$

the inverse matrix $M^{-1}$ can be expressed as follows.

$$M^{-1} = \begin{vmatrix} 2 & -3 \\ -1 & 2 \end{vmatrix}$$

The decrypted signals R2, X2 can thus be obtained from equation (2).

$$\begin{vmatrix} R & 2 \\ X & 2 \end{vmatrix} = \begin{vmatrix} 2 & -3 \\ -1 & 2 \end{vmatrix} \begin{vmatrix} R & 3 \\ X & 3 \end{vmatrix} \tag{2}$$

Equation (2) can be proven. Deriving equation (2) obtains

R2=2·R3−3·X3

X2=−1·R3+2·X3.

If the derivation of equation (1) is substituted for R3 and X3 on the right side of these equations,

2·(2·R2+3·X2)−3·(R2+2·X2)=R2

−1·(2·R2+3·X2)+2·(R2+2·X2)=X2, and the pre-encryption signals R2, X2 can be decrypted.

As shown in FIG. 11, the matrix M can be obtained by the operating circuit 13a comprising multipliers 1310, 1311, 1313, and adders 1312, 1314. The inverse matrix $M^{-1}$ can be obtained by the operating circuit 21a comprising multipliers 2110, 2111, 2113, and adders 2112, 2114. Operating circuits 13b and 13c are identical to operating circuit 13a, and operating circuits 21b and 21c are identical to operating circuit 21a.

Though simple, the embodiment described above enables effective encryption and decryption. The color signals R2 120, G2 121, B2 122 are thus converted to encrypted data by the encryption circuit 13. The ID code $X_2$ from the ID code generator 15 is also mixed with the encryption data. The image signals R3 130, G3 131, B3 132 converted to encrypted data and the ID code signal 133a ($X_3$) are then separated and decrypted by the decryption circuit 21 to the same R2 210, G2 211, B2 212, $X_2$ 213 signals before encryption.

It is to be noted that while n=2 in this embodiment, n may be 3 or 4. If the matrix M is a regular matrix, there will always be only one inverse matrix $M^{-1}$, and decryption is possible. If n=4, signals R2, G2, B2, and X2 can be mixed, further complicating analysis.

Furthermore, only the image signal transmitted between the processing units can be converted to encrypted data using the matrix M and returned to decrypted data using the inverse matrix $M^{-1}$. By this arrangement, the first and second processing units 10 and 20 and the printer 4 can be operated properly only when the proper units are used. Thus, it is possible to prevent unauthorized modification of the copier such as by removing the processing unit equipped with the counterfeiting prevention circuit.

The encryption process can also be a normal MH, MR, MMR, or other run length or DCT encryption process. By performing an encryption/decryption process undisclosed to any third party, the objective of preventing modification of the counterfeiting prevention arrangement can be achieved, and a protection function obtained.

Figure 12:
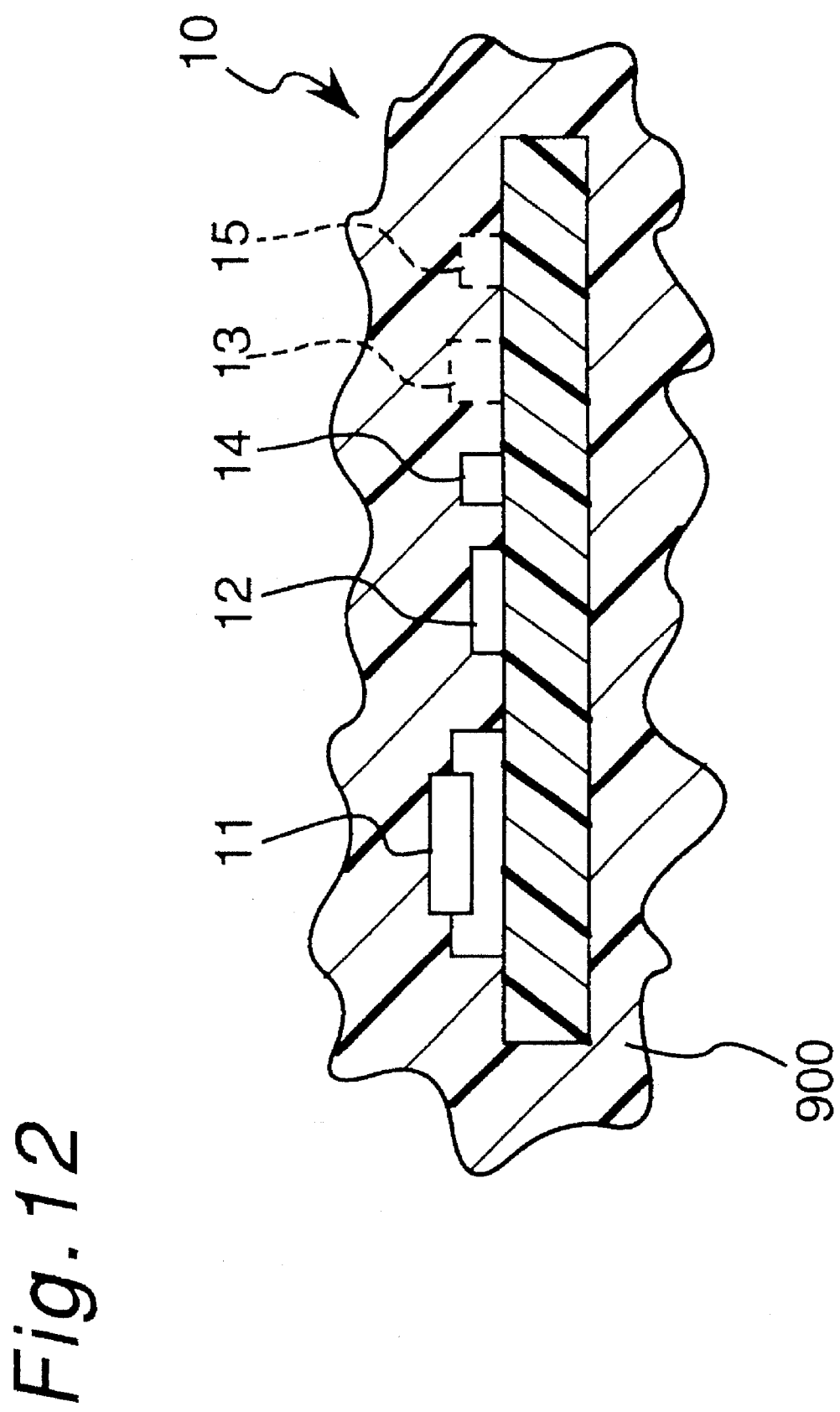
FIG. 12 is a cross sectional view of a molded unit.

A molding of the processing unit 10 using a resin 900 is shown in FIG. 12. A similar molding can also be used for the other processing units 20, 2500.

Note also that if the ID code is changed each time it passes through one of the processing units, analysis of the code is made even more difficult, and the protection function for the counterfeiting prevention arrangement is further strengthened.

Also, the counterfeiting prevention arrangements 14 and 25 can be exchanged and the AND circuits 12 and 26 can be exchanged, and yet having the same result of counterfeiting prevention.

Furthermore, the ID code generator 15 or 1500 can be replaced with a noise generator such as shown at 23. By this arrangement, the image signal transmitted between the processing units will be added with the noise signal to complicate the analysis of the encryption. The added noise signal can be separated from the image signal to ensure the normal operation if a proper processing unit is used.

While the means of protecting against modification of the counterfeiting prevention arrangement described above uses an electrical or electronic control method to produce abnormal output from the imaging system when the counterfeiting prevention arrangement is modified or removed, it is also possible to achieve the same result using mechanical control methods. As described above, each embodiment of the imaging apparatus according to the present invention comprises a counterfeiting prevention arrangement, and prevents modification or removal of the counterfeiting prevention arrangement. In the event the signal connection of the counterfeiting prevention arrangement is interrupted, signal interruption is detected to cause the imaging system to not function or to function abnormally, thereby reliably preventing counterfeit reproduction of currency, negotiable certificates, and other registered documents.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An imaging apparatus comprising:

color image sensor means for reading an original document;

analog-to-digital converter means for converting an analog color signal read by said color image sensor means to a digital color signal;

color masking means for compensating the color data of said digital color signal and for generating image formation data for forming an image;

image forming means for forming an image on a copy sheet based on said image formation data;

encryption means for encrypting said digital color signal and for producing an encrypted signal;

decryption means for decrypting said encrypted signal;

a first single chip for holding at least said analog-to-digital converter means and said encryption means; and a second single chip for holding at least said color masking means and said decryption means where the imaging apparatus only operates when said first single chip and said second single chip are combined.

2. An imaging apparatus as recited in claim 1, wherein:
   a. said first single chip further includes first identification code generation means for generating a first identification code;
   b. said encryption means encrypts said first identification code and said digital color signal in said encrypted signal;
   c. said second single chip includes
      (1) detection means for detecting said identification code from the decrypted signal, and
      (2) a second identification code generation means for providing a second identification code to said image forming means when said first identification code is detected; and
   d. said image forming means forms said image on said copy sheet in response to said second identification code.

3. An imaging apparatus as recited in claim 2, wherein said first identification code and said digital color image are intermixed prior to encryption.

4. An imaging apparatus comprising:

color image sensor means for reading an original document;

analog-to-digital converter means for converting an analog color signal read by said color image sensor means to a digital color signal;

color masking means for compensating the color data of said digital color signal and for generating image formation data for forming an image;

image forming means for forming an image on a copy sheet based on said image formation data;

encryption means for encrypting said digital color signal and for producing an encrypted signal;

decryption means for decrypting said encrypted signal;

a first molded coating means for coating at least said analog-to-digital converter means and said encryption means; and a second molded coating means for coating at least said color masking means and said decryption means where the imaging apparatus only operates when said first molded coating means and said second molded coating means are combined.

5. An imaging apparatus as recited in claim 4, further including first identification code generation means for generating a first identification code;

detection means for detecting said identification code from the decrypted signal; and second identification code generation means for providing a second identification code to said image forming means when said first identification code is detected; and wherein (1) said first molded means coats said first identification code generation means and said encryption means encrypts said first identification code in said encrypted signal, (2) said second molded means further coats said detection means and said second identification code generation means; and (3) said image forming means forms said image on said copy sheet in response to said first identification code.

6. An imaging apparatus as recited in claim 5, wherein said first identification code and said digital color image are intermixed prior to encryption.

7. An imaging apparatus comprising:

color image sensor means for reading an original document;

analog-to-digital converter means for converting an analog color signal read by said color image sensor means to digital color signal;

color masking means for compensating the color data of said digital color signal and for generating an image formation data for forming an image;

image forming means for forming an image on a copy sheet based on said image formation data;

identification code generation means for generating an identification code;

means for intermixing said digital color signal and said identification code prior to encryption;

encryption means for encrypting the intermixed digital color signal and identification code and for producing an encrypted signal;

decryption means for decrypting said encrypting signal and for producing a decrypted signal;

detection means for detecting said identification code from said decrypted signal; and interruption means for interrupting proper operation when said detection means fails to detect said identification code.

8. An imaging apparatus as claimed in claim 7, wherein said encryption means encrypts said digital color signal by a matrix operation to obtain said encrypted signal, and wherein said decryption means decrypts said encrypted signal by an inverse matrix operation.

9. An imaging apparatus as claimed in claim 7, wherein said identification code is a video signal comprising an array of plural characters.

10. An imaging apparatus as claimed in claim 7, further including:

a first single chip for holding at least said identification code generation means, said encryption means, and said analog-to-digital converter means to prevent said imaging apparatus from forming said image on said copy sheet if said first single chip is removed; and a second single chip for holding at least said decryption means, said detection means, color masking means, and said interruption means for interrupting proper operation to prevent said imaging apparatus from forming said image on said copy sheet if said second single chip is removed.

11. An imaging apparatus comprising:

color image sensor means for reading an original document;

analog-to-digital converter means for converting an analog color signal read by said color image sensor means to a digital color signal;

color masking means for compensating the color data of said digital color signal and for generating image formation data for forming an image;

image forming means for forming an image on a copy sheet based on said image formation data;

identification code generation means for generating an identification code;

means for intermixing said digital color signal and said identification code prior to encryption;

encryption means for encrypting the intermixed digital color signal and identification code, and for producing an encrypted signal;

decryption means for decrypting said encrypted signal;

a first single chip for holding at least said analog-to-digital converter means and said encryption means; and a second single chip for holding at least said color masking means and said decryption means.

12. An imaging apparatus comprising:

color image sensor means for reading an original document;

analog-to-digital converter means for converting an analog color signal read by said color image sensor means to a digital color signal;

color masking means for compensating the color data of said digital color signal and for generating image formation data for forming an image;

image forming means for forming an image on a copy sheet based on said image formation data;

identification code generation means for generating an identification code;

means for intermixing said digital color signal and said identification code prior to encryption;

encryption means for encrypting the intermixed digital color signal and identification code, and for producing an encrypted signal;

decryption means for decrypting said encrypted signal;

a first molded coating means for coating at least said analog-to-digital converter means and said encryption means; and a second molded coating means for coating at least said color masking means and said decryption means.

13. An imaging apparatus comprising:

color image sensor means for reading an original document to produce an image signal;

image forming means for forming an image on a copy sheet based on the image signal;

encryption means for encrypting said image signal and for producing an encrypted signal;

decryption means for decrypting said encrypted signal;

a first single chip for holding at least said encryption means; and a second single chip for holding at least said decryption means where the imaging apparatus only operates when said first single chip and said second single chip are combined.

14. An imaging apparatus comprising:

color image sensor means for reading an original document to produce an image signal;

image forming means for forming an image on a copy sheet based on said image signal;

encryption means for encrypting said image signal and for producing an encrypted signal;

decryption means for decrypting said encrypted signal;

a first molded coating means for coating at least said encryption means; and a second molded coating means for coating at least said decryption means where the imaging apparatus only operates when said first molded coating means and said second molded coating means are combined.

* * * * *